United States Patent [19]

Clements

[11] Patent Number: 5,622,081
[45] Date of Patent: Apr. 22, 1997

[54] MULTIPLE SPEED SHAFT DRIVE FOR A BICYCLE

[76] Inventor: Thomas M. Clements, 34711 Jefferson, Apt. #3, Harrison Township, Mich. 48045

[21] Appl. No.: 580,944

[22] Filed: Dec. 29, 1995

[51] Int. Cl.⁶ .............................. F16H 3/08; B62M 11/04
[52] U.S. Cl. ..................... 74/351; 74/347; 280/238; 280/260
[58] Field of Search ..................... 74/347, 351, 366; 280/238, 260; 476/33

[56] References Cited

U.S. PATENT DOCUMENTS

| | | | |
|---|---|---|---|
| 3,863,503 | 2/1975 | Loeb et al. | 74/347 |
| 4,447,068 | 5/1984 | Brooks | 280/260 |
| 5,078,416 | 1/1992 | Keyes | 280/260 |
| 5,136,892 | 8/1992 | Ochs | 476/33 |
| 5,136,893 | 8/1992 | Wilhelmy | 74/473 R |
| 5,228,354 | 7/1993 | Oosterwal et al. | 74/347 |
| 5,251,504 | 10/1993 | Summerville, Jr. et al. | 74/366 X |
| 5,273,500 | 12/1993 | Nagano | 475/312 |
| 5,342,075 | 8/1994 | Williams | 280/236 |
| 5,496,049 | 3/1996 | Escobedo | 280/238 |

Primary Examiner—Charles A. Marmor
Assistant Examiner—Troy Grabow
Attorney, Agent, or Firm—Peter D. Keefe

[57] ABSTRACT

A multiple speed shaft drive for a bicycle, including: a forward disk having a plurality of concentrically disposed ring gears, wherein the forward disk is connected with the pedal crank of the bicycle; a rearward disk having a plurality of concentrically disposed ring gears, wherein the rearward disk is connected to the rear wheel hub; a forward drive shaft; a rearward drive shaft; a free wheel mechanism connecting the forward drive shaft to the rearward drive shaft; a forward pinion gear slidably mounted to the forward drive shaft; a rearward pinion gear slidably mounted to the rearward drive shaft; a forward gear shift mechanism for moving the forward pinion gear into gearing engagement with a selected ring gear of the forward disk; a rearward gear shift mechanism for moving the rearward pinion gear into gearing engagement with a selected ring gear of the rearward disk; and a clutch mechanism which automatically disengages the rearward hub from gearing engagement with the rearward pinion gear whenever a gear shift is made with a shift control operated by the cyclist.

20 Claims, 4 Drawing Sheets

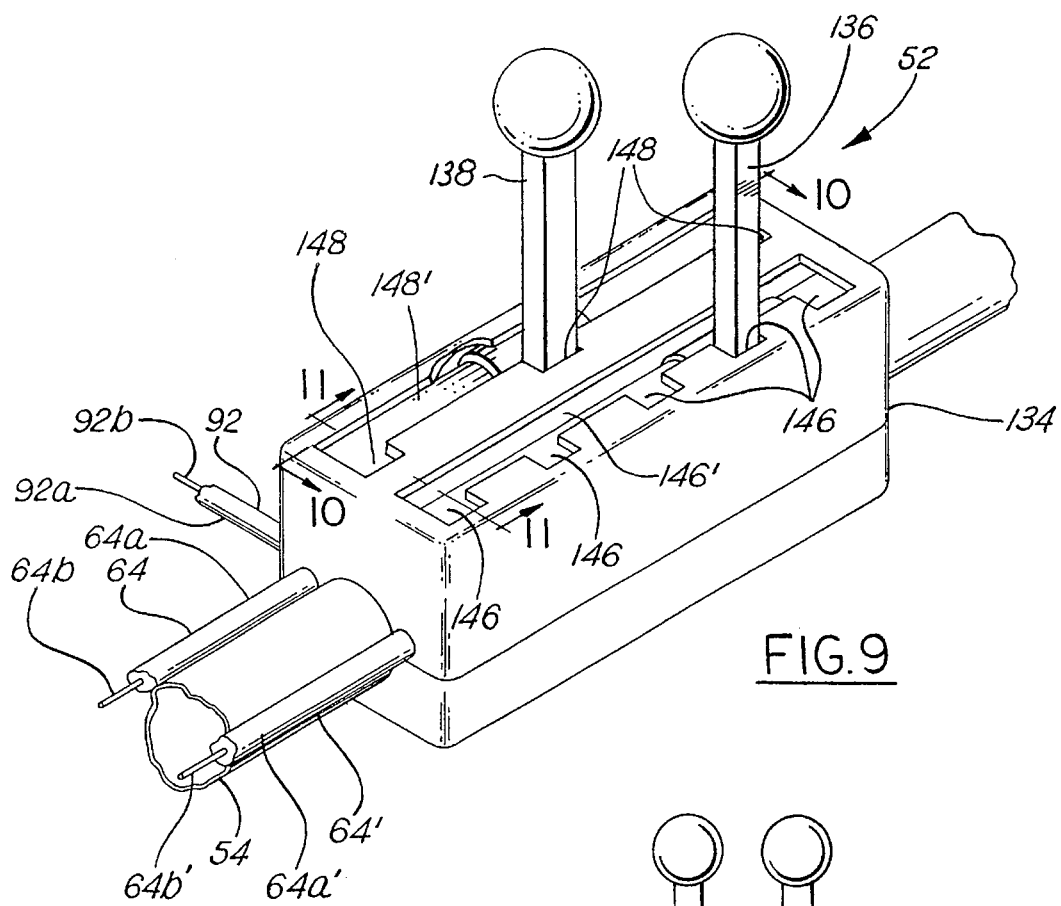
FIG.9
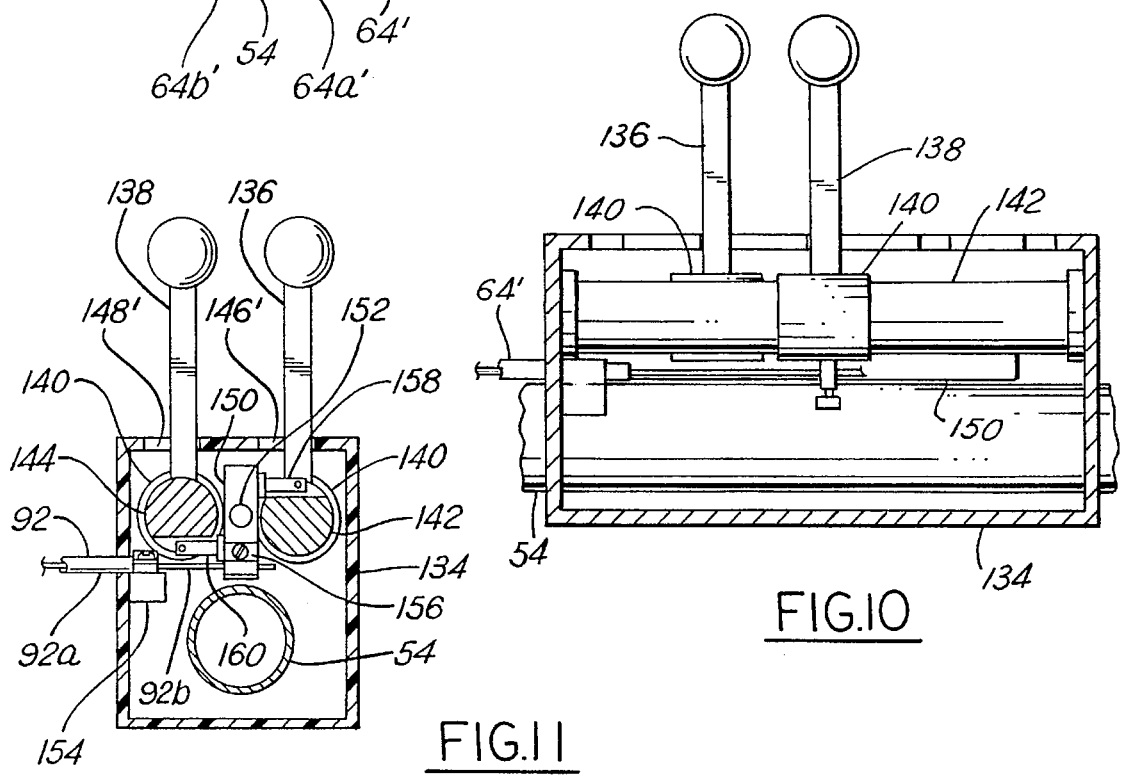
FIG.10
FIG.11

5,622,081

MULTIPLE SPEED SHAFT DRIVE FOR A BICYCLE

BACKGROUND OF THE INVENTION

1. Field of the Invention

The present invention relates to bicycle drives, and more particularly to shaft drives therefor. Still more particularly, the present invention relates to a shaft drive for a bicycle, wherein a number of gear ratios are provided and wherein clutching is provided at gear shifting.

2. Description of the Prior Art

Conventional bicycle drives utilize a chain drive composed of a chain and sprockets to thereby transfer motion from the pedal crank to the rear wheel of the bicycle. There are a number of disadvantages associated with chain drives, including the danger of clothes being caught therein, stretching of the chain, and chain failure. Gear ratio variations have been incorporated in chain drives, such as the derailleur. Problems with such systems which can manifest including the chain jumping off its sprocket. Accordingly, alternative drive mechanisms for bicycles would be advantageous provided they do not suffer from the above noted disadvantages, nor pose new ones of their own. In the prior art there are several shaft drives which have been proposed and are of interest to consider.

One such shaft drive is described in U.S. Pat. No. 5,078,416. The pedal crank has connected thereto a driver bevel gear, and the rear hub has connected thereto a driven bevel gear. Appropriate bevel gear shafts connect the drive and driven gears, wherein a 2:1 ratio therebetween is preferred.

Another such shaft drive is described in U.S. Pat. No. 5,136,892. A drive gear is connected with the pedal crank, a drive shaft gearingly connects to the drive gear. At the other end of the drive shaft is a drive head. The drive head frictionally interfaces with a flat face connected to the rear hub. Selective movement of the drive head with respect to the center of rotation of the flat face achieves gear ratio variation for the bicycle.

Yet another such shaft drive is described in U.S. Pat. No. 5,342,075. A forward face gear is provided on a backing disc and is connected with the pedal crank, while an aft face gear is provided on another backing disc and is connected with the free wheel mechanism at the rear hub. Each face gear has a plurality concentric raised teeth sets. A pinion gear (aft and forward) is connected with each end, respectively, of a telescope pinion shaft. The aft pinion gear is positionable by a cable, while the forward pinion gear is positionable by the cyclist. Selection of which gear set is meshed with the pinion gears determines the speed ratio.

Clearly, a direct shaft drive is superior to a chain drive. Yet, the above recounted shaft drive mechanisms do not offer the reliability and ease of shifting provided by multiple speed conventional chain drives. What remains needed in the art is a shaft drive which affords easy and simple cable controlled gear shifting together with reliable and smooth clutching action as the gears are shifted.

SUMMARY OF THE INVENTION

The present invention is a shaft drive which provides easy and simple cable controlled gear shifting together with reliable and smooth clutching action as the gears are shifted.

The multiple speed shaft drive according to the present invention includes: a forward disk having a plurality of concentrically disposed ring gears, wherein the forward disk is connected with the pedal crank of the bicycle; a rearward disk having a plurality of concentrically disposed ring gears, wherein the rearward disk is connected to the rear wheel hub; a forward drive shaft; a rearward drive shaft; a free wheel mechanism connecting the forward drive shaft to the rearward drive shaft; a forward pinion gear slidably mounted to the forward drive shaft; a rearward pinion gear slidably mounted to the rearward drive shaft; a forward gear shift mechanism for moving the forward pinion gear into gearing engagement with a selected ring gear of the forward disk; a rearward gear shift mechanism for moving the rearward pinion gear into gearing engagement with a selected ring gear of the rearward disk; and a clutch mechanism which automatically disengages the rearward hub from gearing engagement with the rearward pinion gear whenever a gear shift is made with a shift control operated by the cyclist.

Accordingly, it is an object of the present invention to provide a clutch operated direct gear drive for a bicycle.

It is an additional object of the present invention to provide a clutch operated direct gear drive for a bicycle, wherein clutching is automatic when the bicyclist shifts gears.

It is another object of the present invention to provide a clutch operated direct gear drive for a bicycle, wherein clutching is automatic when the bicyclist shifts gears and wherein gears are shiftable with respect to gear sets located at each of the pedal crank and the rear wheel hub.

It is yet a further object of the present invention to provide a clutch operated direct gear drive for a bicycle, wherein clutching is automatic when the bicyclist shifts gears and wherein a free-wheel mechanism is provided between the pedal crank and the rear wheel hub.

These, and additional objects, advantages, features and benefits of the present invention will become apparent from the following specification.

BRIEF DESCRIPTION OF THE DRAWINGS

FIG. 9 is a perspective view of the shift controller of the multiple speed shaft drive according to the present invention, installed on a bicycle frame.

FIG. 10 is a partly sectional side view of the shift controller of the multiple speed shaft drive according to the present invention.

FIG. 11 is a partly sectional end view of the shift controller of the multiple speed shaft drive according to the present invention.

DETAILED DESCRIPTION OF THE PREFERRED EMBODIMENT

Figure 1:
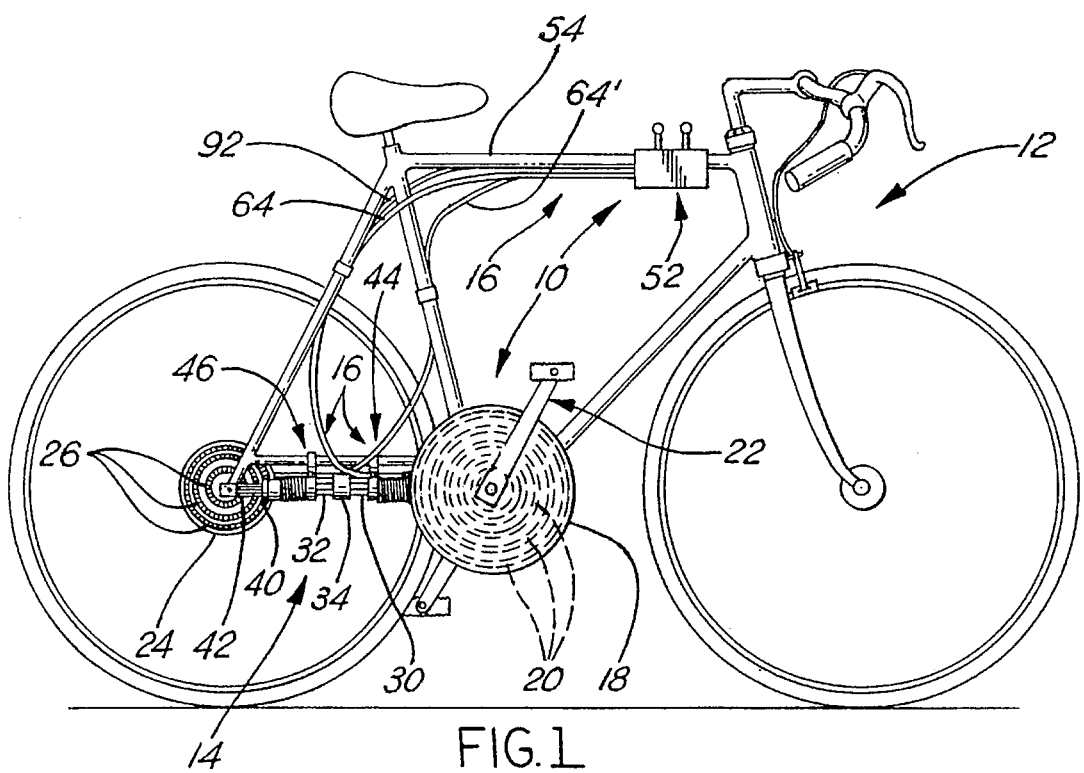
FIG. 1 is a side view of a bicycle equipped with the multiple speed shaft drive according to the present invention.
Figure 2:
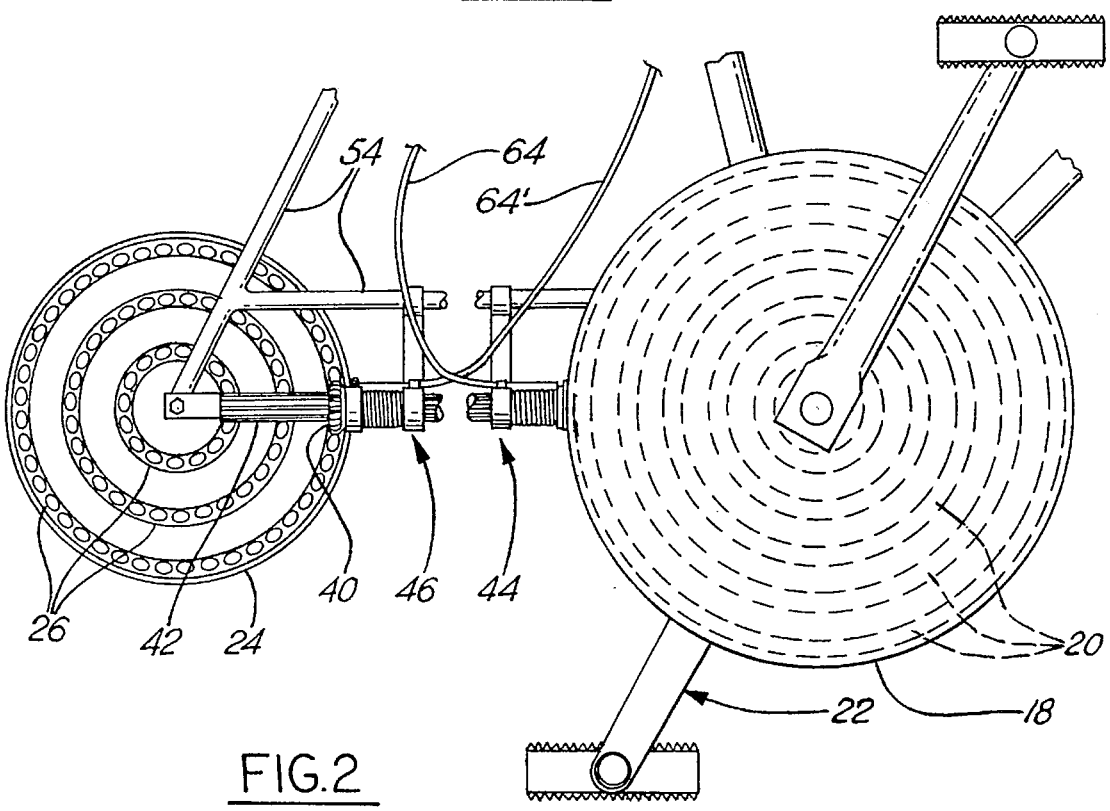
FIG. 2 is a broken away, detail view of the drive assembly of the multiple speed shaft drive according to the present invention, shown installed on a bicycle.
Figure 3:
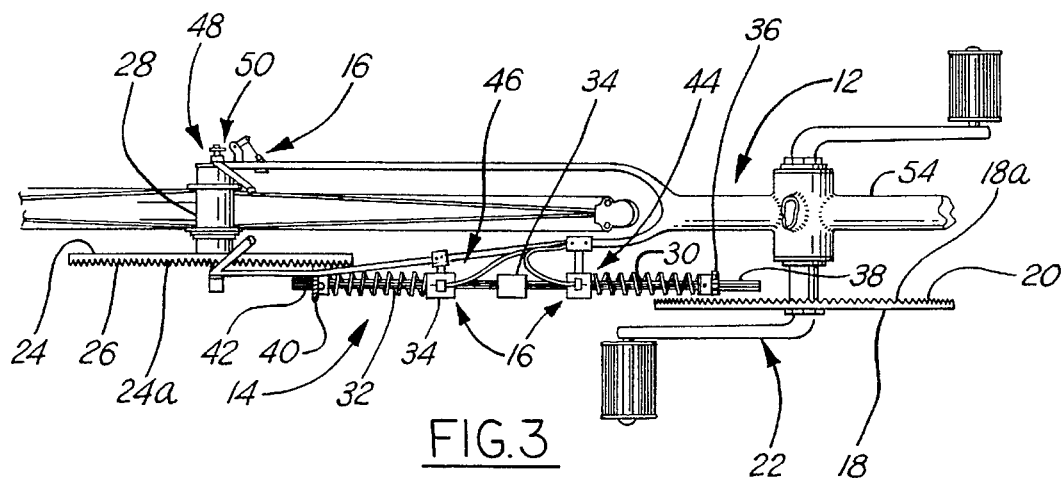
FIG. 3 is a broken away, top plan view of a bicycle equipped with the multiple speed shaft drive according to the present invention.

Referring now to the Drawing, FIGS. 1 and 3 show generally the multiple speed shaft drive 10 according to the present invention installed on a bicycle 12. The multiple speed shaft drive 10 includes a drive assembly 14 and a clutch assembly 16. The drive assembly 14 includes: a forward disk 18 having a plurality of concentrically disposed forward ring gears 20, wherein the forward disk is connected with the pedal crank 22 of the bicycle; a rearward disk 24 having a plurality of concentrically disposed rearward ring gears 26, wherein the rearward disk is connected to the rear wheel hub 28; a forward drive shaft 30; a rearward drive shaft 32; a free wheel mechanism 34 connecting the forward drive shaft to the rearward drive shaft; a forward pinion gear 36 slidably mounted to splines 38 of the forward drive shaft; and a rearward pinion gear 40 slidably mounted to splines 42 of the rearward drive shaft. The clutch assembly 18 includes: a forward pinion gear reciprocation mechanism 44 for moving the forward pinion gear 36 into gearing engagement with a selected forward ring gear 20 of the forward disk 18; a rearward pinion gear reciprocation mechanism 46 for moving the rearward pinion gear 40 into gearing engagement with a selected rearward ring gear 26 of the rearward disk 24; a clutch mechanism 48 which, via a clutch regulator 50 located at the rear wheel hub 28, automatically disengages the rearward disk from gearing engagement with the rearward pinion gear whenever a gear shift is made with a shift controller 52 operated by the cyclist.

In operation, when the cyclist wishes to change gears, he or she need only move a shift lever of the shift controller to achieve reciprocation of a selected pinion gear into engagement with a newly selected ring gear, wherein the combination of the free wheel mechanism and the clutch mechanism will provide seamless and effortless shifting, while cycling or while at rest.

Referring now additionally to remaining FIGS. 2 and 4 through 11, the structure and function of the the multiple speed shaft drive 10 will be detailed with greater specificity.

The bicycle 12 includes a frame 54 to which each of the rear wheel hub 28 and the pedal crank 22 are rotatably connected. The frame 54 shown in the Drawing is by way of example only; the actual configuration of the frame may vary according to design criteria well known in the bicycle art.

The forward disk 18 is preferably composed of a durable, noncorrodable material, such as stainless steel. The forward disk 18 is connected with the pedal crank 22 so as to be necessarily rotatable in unison therewith. One face, preferably the interior face 18a, of the forward disk 18 is provided with the aforementioned forward ring gears 20. The forward ring gears 20 have teeth formed on the face of the forward disk, wherein "formed" is meant to include formed on a disk connected with the face of the forward disk. The number of forward ring gears 20 is selectable from at least one, to two, three, four, five or more, depending on the diameter of the forward disk 18. The forward ring gears 20 are arranged concentrically with respect to the axis of rotation of the forward disk 18. The forward pinion gear 36 is provided with teeth on its periphery which are sized and spaced to gearingly mesh with the teeth of each of the forward ring gears 20.

The rearward disk 24, like the forward disk, is preferably composed of a durable, noncorrodable material, such as stainless steel. The rearward disk 24 is connected with the rear wheel hub 28 so as to be necessarily rotatable in unison therewith. One face, preferably the exterior face 24a, of the rearward disk 24 is provided with the aforementioned rearward ring gears 26. The rearward ring gears 26 have teeth formed on the face of the rearward disk, wherein "formed" is, like the forward disk, meant to include formed on a disk connected with the face of the rearward disk. The number of rearward ring gears 26 is selectable from at least one, to two, three, four, five or more, depending on the diameter of the rearward disk 24. The rearward ring gears 26 are arranged concentrically with respect to the axis of rotation of the rearward disk 24. The rearward pinion gear 40 is provided with teeth on its periphery which are sized and spaced to gearingly mesh with the teeth of each of the rearward ring gears 26.

Referring for the moment to FIGS. 1 through 5, the forward and rearward pinion gear reciprocation mechanisms 44, 46 can be understood whereby the forward and rearward pinion gears 36, 40 are independently moved between respective forward and rearward ring gears 20, 26.

Figure 4:
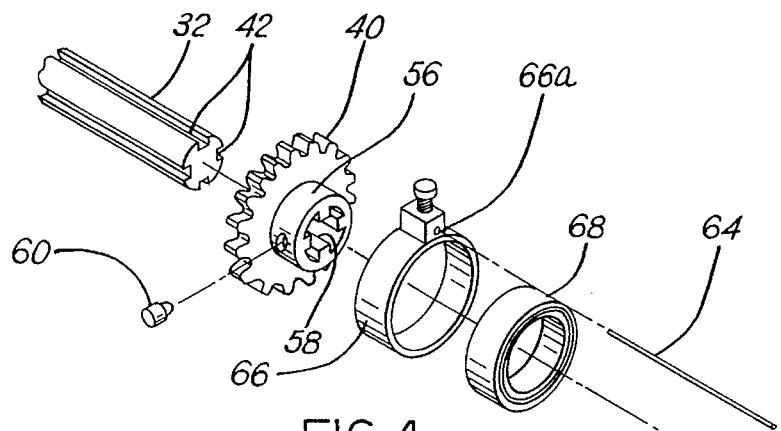
FIG. 4 is an exploded perspective view of a pinion gear reciprocation mechanism of the multiple speed shaft drive according to the present invention.

FIG. 4 depicts how the rearward pinion gear 40 is configured for being reciprocable along the rearward drive shaft 32. As mentioned, the rearward drive shaft 32 has splines 42. The rearward pinion gear 40 includes an integral annular stem 56. Both the rearward pinion gear 40 and its stem 56 have a splined axial core 58 which gearingly meshes with the splines 42 of the rearward drive shaft 32. Accordingly, the rearward pinion gear 40 is slidable along the splines 42 of the rearward drive shaft 32, but because of the enmeshed gearing therebetween the rearward pinion gear is forced to rotate in unison with the rearward drive shaft, Preferably, the location of the rearward pinion gear 40 with respect to the rearward drive shaft 32 is determined, at least in part, by a spring loaded detent ball 60 being received into a concave seat 62 provided at alignably selected locations along the rearward drive shaft whereat the rearward pinion gear meshes with selected rearward ring gears 26. The detent ball 60 may be for example connected to the rearward pinion gear via the stem 56, as shown.

The shift controller 52 interfaces with the rearward pinion gear 40 via a rearward shift cable 64'. The end of the rearward shift cable 64' is received into a setscrew tightened receptacle 66a in a rearward cable connection sleeve 66. In order to connect the rearward cable connection sleeve 66 to the rearward pinion gear 40, any rotation thereof must be nullified. This nullification is accomplished via a rearward roller bearing 68, which is press fit, or otherwise interconnected such as by spot welding, with the stem 56 and the rearward cable connection sleeve 66.

Figure 5:
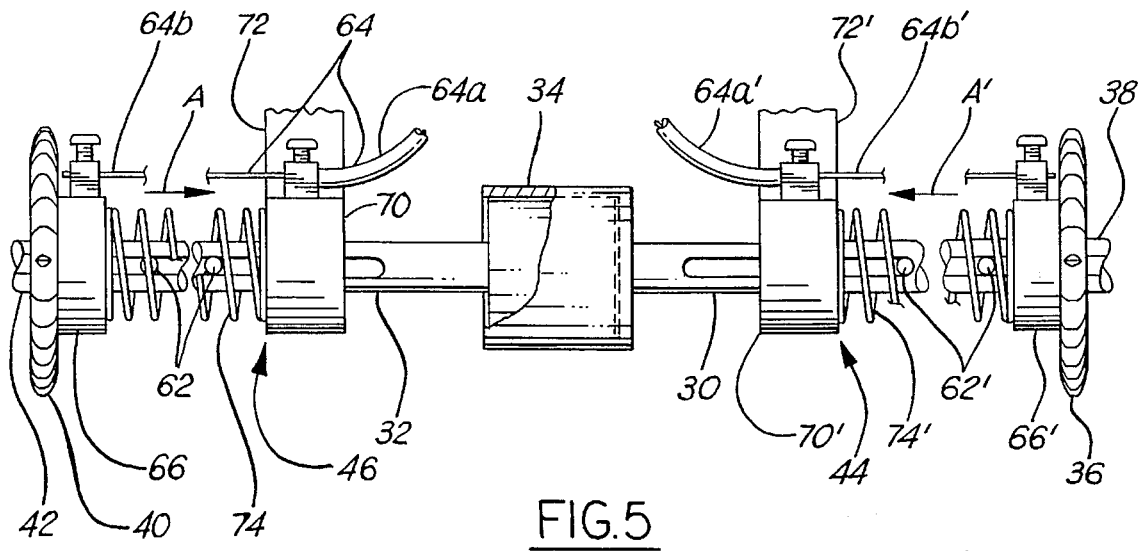
FIG. 5 is a broken away side view of the shaft drive components of the multiple speed shaft drive according to the present invention.

Now referring to FIG. 5, the rearward pinion gear reciprocation mechanism 46 will become clear. A stationary rearward bracket 70 is connected, via a mounting member 72, with the frame 54 and further fixedly connected with the sheathing 64a of the rearward shift cable 64', wherein the inner cabling 64b of the rearward shift cable is slidable with respect thereto. A rearward pinion gear biasing spring 74 is provided between the rearward pinion gear 40 and the rearward bracket 70, whereby the rearward shift cable need only apply selected amounts of greater or lesser pull force along arrow A in order to secure movement of the rearward pinion gear in either direction. Accordingly, when the inner cabling 64b is caused to move in relation to the sheathing 64a via the shift controller 52, the rearward pinion gear 40 moves in relation to the rearward drive shaft 32 and the rearward ring gears 26.

The forward pinion gear reciprocation mechanism 44 is analogous to the rearward pinion gear reciprocation mechanism 46, wherein parts (not otherwise before referenced) having like structure and function are designated in the Drawing by like numerals with a prime, so that no further explanation thereof is needed for those having ordinary skill in the mechanical arts to understand its structure and function.

As shown in FIG. 5, the forward and rearward drive shafts 30, 32 are interconnected by a free wheel mechanism 34. Free wheel mechanisms allow rotational driving between input and output drive components in only one direction of rotation and free spinning therebetween in the opposite direction of rotation. A suitable free wheel mechanism 34 is model MF-Z012 manufactured by NA Shimano of Singapore.

Figure 6:
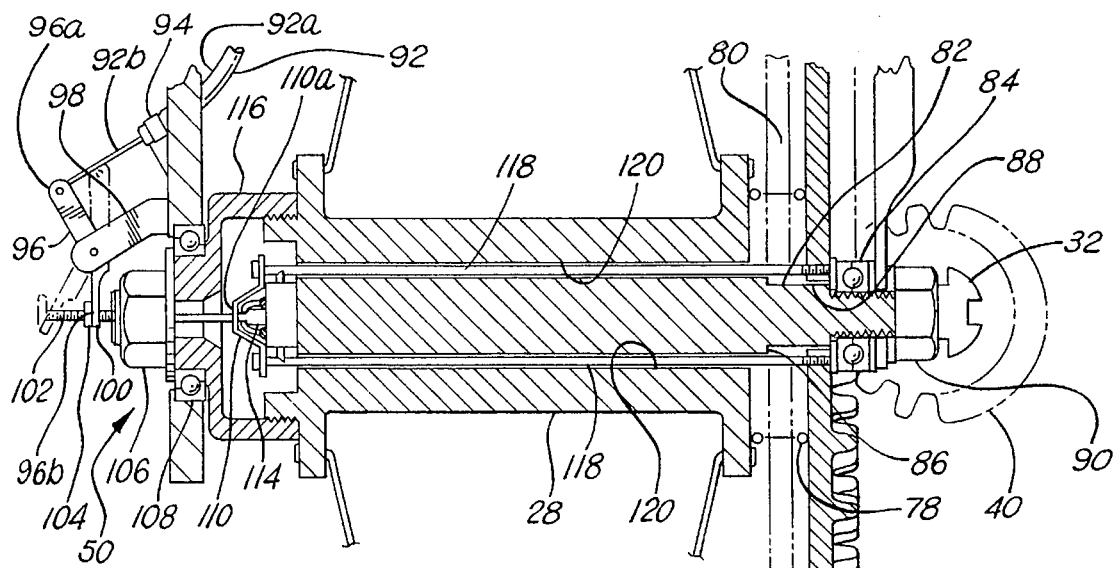
FIG. 6 is a broken away, partly sectional view of the clutch assembly of the multiple speed shaft drive according to the present invention incorporated into the hub of the rear wheel of a bicycle.
Figure 7:
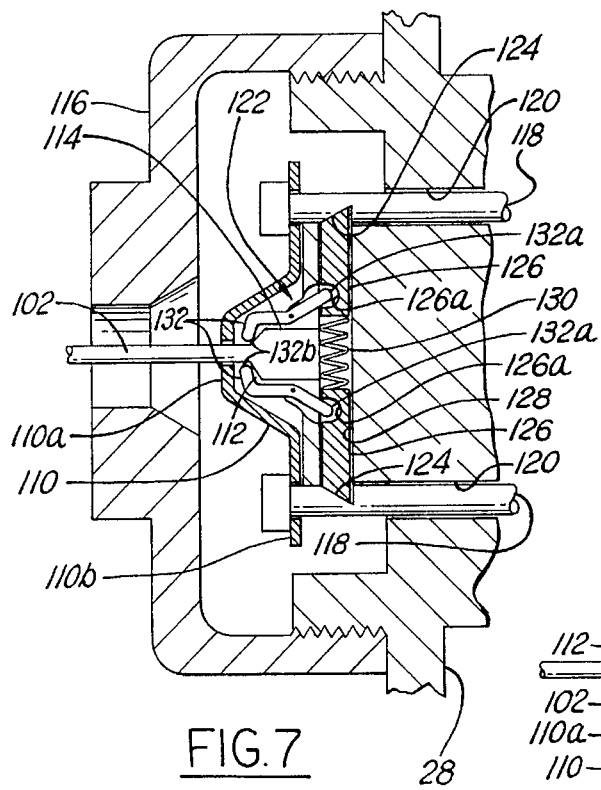
FIG. 7 is a detail broken away, partly sectional end view of the clutch regulator of the clutch assembly of the multiple speed shaft drive according to the present invention, shown in its locked state wherein the clutch is not engaged.
Figure 8:
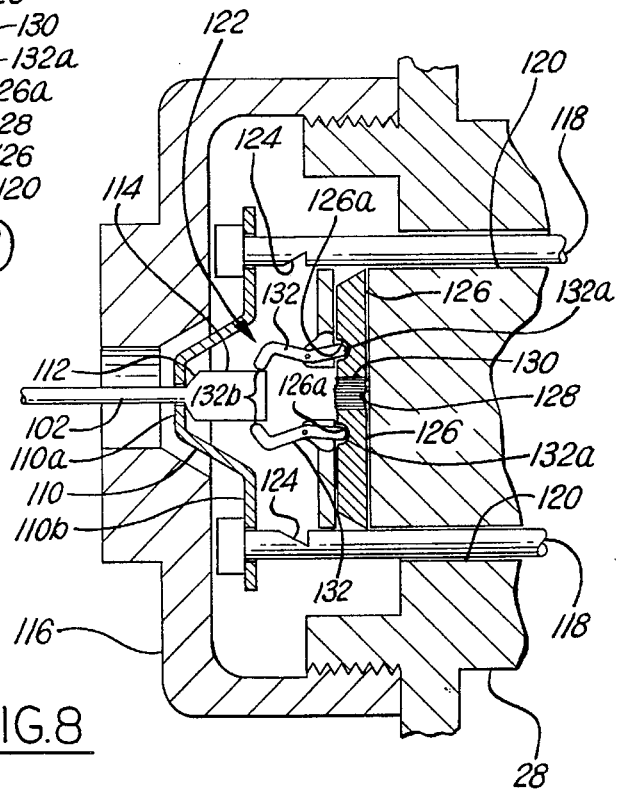
FIG. 8 is a detail broken away, partly sectional end view of the clutch regulator of the clutch assembly of the multiple speed shaft drive according to the present invention, shown in its unlocked state wherein the clutch is engaged.

Attention will now progress to the clutch mechanism 48, with reference being directed in particular to FIGS. 6 through 8.

The rearward disk 24 is mounted to the rear wheel hub 28 so that it must rotate in unison therewith, but is axially slidable with respect thereto. A rearward disk biasing spring 78 is located in an annular slot 80 formed by the rear wheel hub 28 and the rearward disk 24. Accordingly, the rearward disk 24 is biased away from the rear wheel hub 28 toward the rearward pinion gear 40. The rearward disk 24 is slidably guided on a reduced diameter portion 82 of the rear wheel hub 28 between a wheel bearing 84 (which interfaces with the frame 54) and an annular flange 86 of the rear wheel hub via an axial aperture 88 therein which receives the reduced diameter portion.

As can be seen from FIG. 6, this area of the rear wheel hub 28 is engaged with the frame 54 via a wheel mounting nut 90. The other end of the rear wheel hub is threadingly engaged with a mounting drum 116, and the mounting drum carries a wheel bearing 108 on which the frame 54 rests. A mounting nut 106 holds the frame 54 onto the wheel bearing 108.

Axial sliding of the rearward disk 24 is controlled at the clutch regulator 50. A clutch control cable 92 extends from the shift controller 52 and terminates at the clutch regulator 50. In this regard the sheathing 92a thereof is connected with a catch 94 which is, in turn, fixedly connected witch the frame 54. The cabling 92b of the clutch control cable 92 is slidable with respect to the catch 94 and pivotally terminates at one end 96a of a lever arm 96. The lever arm 96 is pivotally connected to a mounting member 98 which is, in turn, connected with the frame 54. The other end 96b of the lever arm 96 terminates in a clevis 100 (or alternatively an aperture). Engaged through the clevis/aperture 100 is a threaded end portion of a control rod 102. A control rod nut 104 is threaded selectively onto the control rod 102 to interface properly with the clevis/aperture, as will become clear momentarily. The control rod 102 passes through the mounting drum 116, the wheel mounting nut 106, the wheel bearing 108, and a frustoconical keeper 110 having a flat apex 110a and an annular lip 110b. The control rod 102 has a taper 112 which forms a bulbous end portion 114 (see FIGS. 7 and 8) which is interferingly abuttable with the flat apex 110a.

The annular lip 110b of the frustoconical keeper 110 has at least two oppositely located holes through which a control bolt 118 respectively passes, whereupon the head thereof provides trapping of the control bolts with respect to the keeper 110. The rear wheel hub 28 is provided with a passage 120 for each control bolt 118, whereby each control bolt extends to the rearward disk 24 and is threadingly engaged therewith. Rotation of the rearward disk 24 is transferred to the rear wheel hub 28 via the control bolts 118 abutting their respective passage 120. Clutching is accomplished by the control rod 102 being moved in a direction axially away from the rearward pinion gear 40, whereupon the rearward disk 24 is forced to follow movement of the control rod, thereby compressing the rearward disk biasing spring 78 and separating the rearward disk from gearingly meshed engagement with the rearward pinion gear.

In order that the rearward disk 24 be locked into gearingly meshed engagement with the rearward pinion gear 40 except when it is desired to clutch, a clutch latch mechanism 122 is provided. As most clearly discerned from FIGS. 7 and 8, each of the control bolts has a notch 124 into which a respective pin 126 seats. The pins 126 are slidably mounted into a transverse bore 128 of the rear wheel hub 28. The pins 126 are biased apart by a pin spring 130 therebetween. When seated in the respective notches 124, the pins 126 prevent the control bolts 118 from sliding with respect to the rear wheel hub 28. In order for the control bolts 118 to slide with respect to the rear wheel hub 28, the pins 126 must be retracted from their seated position as shown in FIG. 7.

Retraction of the pins 126 is provided by fingers 132 interacting with the bulbous end portion 114 and the pins. A midpoint of the fingers 132 is pivotally connected with the rear wheel hub 28. One end 132a of each of the fingers 132 rests into a recess 126a in a respective pin 126. The opposite end 132b of the fingers 132 is bent over the taper 112 into abutting relation with the control rod 102 adjacent thereto. The taper 112 is spaced from the flat apex 110a when the fingers 132 are seated in the notches 124 via biasing of the pin spring 130.

Clutching is operated as follows (see FIGS. 7 and 8). The cyclist causes the cabling 92b of the clutch control cable 92 to be pulled in relation to the sheathing 92a, thereby causing the lever arm 96 to pivot. The clevis/aperture 100 thereof then pulls upon the control rod 102 in a direction away from the rearward pinion gear 40, so that the taper 112 moves past the bent over end 132b whereupon the fingers 132 pivot and cause the fingers to slide against the biasing of the pin spring 130 until the fingers are no longer seated in the notches 124. The taper 112 then strikes the flat apex 110a whereupon the frustoconical keeper 110 causes the control bolts 118 to axially move the rearward disk 28 away from the rearward pinion gear 40 against the biasing of the rearward disk biasing spring 78. When pulling on the control rod ceases, the rearward disk biasing spring then causes the control rod, control bolts and the rearward disk to move toward the rearward pinion gear, whereupon a selected rearward ring gear of the rearward disk again gearingly meshes with the rearward pinion gear.

The structure and function of the shift controller 52 will now be detailed with reference being particularly directed to FIGS. 9 through 11.

The shift controller 52 includes a housing 134 which is mounted to the frame 54. Preferably, one shift lever 136, 138 is provided, respectively, for each of the shift cables 64, 64' of the forward and rearward pinion gears 36, 40. By moving in a first direction a selected one of the shift levers 136, 138 relative to the housing 134, the cabling of the respective shift cable 64, 64' is caused to be pullingly slid relative to the sheathing thereof; and, by moving in a second direction (opposite to the first direction) the selected one of the forward and rearward shift levers 136, 138 relative to the housing 134, the cabling 64b, 64b' of the respective shift cable 64, 64' is caused to be slid relative to the sheathing 64a, 64a' thereof via the biasing of the respective biasing spring 74, 74'. Accordingly, selective application of pull force to the cabling 64b, 64b' supplied, respectively, by the forward or rearward shift levers effects shifting in either direction of movement of the respective forward and rearward pinion gears along its respective forward and rearward drive shafts. The sheathing 64a, 64a' are each affixed with respect to the housing 138 so that only the cabling 64b, 64b' move with the forward and rearward shift levers 136, 138.

Preferably, each of the shift levers 136, 138 is slidably mounted, respectively, via a sleeve 140, on cylindrical guides 142, 144 which are, in turn, mounted to the housing 134. Preferably, the stop location for aligning the forward pinion gear 36 with each of the forward ring gears 20 is provided by guide slots 146, one being provided, respectively, for each forward ring gear (five slots being shown by way of example for each of five forward ring gears). Preferably further, the stop location for aligning the rearward pinion gear 40 with each of the rearward ring gears 26 is provided by guide slots 148, one being provided, respectively, for each rearward ring gear (three slots being shown by way of example for each of three rearward ring gears). The spacing of the slots 146, 148 is concomitant with respect to the locations of the concave seats 62 so that each of the forward and rearward pinion gears perfectly aligns, respectively, with each of the forward and rearward ring gears when the forward and rearward shift levers are each in a respective slot thereof; whereupon, the forward and rearward pinion gears are gearingly meshed with a particular respective forward and rearward ring gear. Gear changing movement of the forward shift lever 136 is along an elongated slot 146' which communicates with the slots 146; gear changing movement of the rearward shift lever 138 is along an elongated slot 148' which communicates with the slots 148.

In order to effect clutching via the clutch regulator 50 when either of the forward and rearward shift levers 136, 136 are moved from one guide slot 146, 148 to another, the clutch control cable 92 interfaces operably with the shift controller 52. As best shown by FIG. 11, a clutch rocker 150 is pivotally mounted on a rocker dowel 152 which is connected with the housing 134. The clutch rocker 150 runs substantially the length of the housing 134. The sheath 92a of the clutch control cable 92 is affixed to a catch 154 connected with the housing 134. The cabling 92b of the clutch control cable 92 thereof is connected with a setscrew tightened receptacle 156 connected with one side of the clutch rocker 150.

The forward shift lever 136 includes a transverse oriented push rod 158, and the rearward shift lever 138 includes a transverse oriented push rod 160, wherein each is directed abuttingly toward the clutch rocker 150. Whenever either the forward or the rearward shift lever 136, 138 is rotated out of its respective guide slots 146, 148 into its respective elongated slot 146', 148', the respective push rod 158, 160 thereof pushes upon the clutch rocker 150 to thereby rotate it so that the cabling 92b is pulled, thereby operating the clutch regulator as hereinabove recounted. Accordingly, since the forward shift lever 136 rotates counterclockwise to be moved out of its guide slots 146 into its elongated slot 146' in FIG. 11, the push rod 158 thereof is located above the rocker dowel 152; and, since the rearward shift lever 138 rotates also counterclockwise to be moved out of its guide slots 148 into its elongated slot 148' in FIG. 11, the push rod 160 thereof is located below the rocker dowel 152. Thusly, whenever a shift in location of either the forward or rearward shift lever 136, 138 is made, the clutch rocker 150 is rotated (counterclockwise in FIG. 11) so as to pull on the cabling 92b of the clutch control cable 92, thereby effecting actuation of clutching of the rearward disk 24 in relation to the rearward pinion gear 40 via the clutch regulator 50. When the subject forward or rearward shift lever 136, 138 is returned into one of its respective guide slots 146, 148, the rearward disk biasing spring 78 pulls on the cabling 92b of the clutch control cable 92 to thereby restore the clutch rocker 150 to its neutral position as shown in FIG. 11.

In operation, the cyclist may shift whenever desired whether the bicycle is moving or is stationary. The speed ratio of the bicycle is determined by gear shifting wherein the cyclist selects which forward ring gear gearingly meshes with the forward pinion gear and/or which rearward ring gear gearingly meshes with the rearward pinion gear. Gear shifting is effected by moving a selected forward or rearward shift lever from one guide slot to another. In so doing, the clutch control cable causes the clutch regulator to slide the rearward disk out of gearingly meshed relation with the rearward pinion gear. In so doing further, the respective forward or rearward shift cable causes the associated forward or rearward pinion gear reciprocation mechanism to move the subject forward or rearward pinion gear into the selected other respective forward or rearward ring gear. One or both of the forward and rearward shift levers may be operated to effect selected gearing changes.

It should be noted that it is possible to effect gear changes between the forward ring gears and the forward pinion gear without the necessity of the rearward disk being clutchingly disconnected from the rearward pinion gear because of the location of the free wheel mechanism between the forward and rearward shafts. Accordingly, the preferred embodiment description hereinabove provided may be accordingly modified to effect clutching only with respect to the operation of the rearward shift lever.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A multiple speed shaft drive for a bicycle, wherein the bicycle has a frame and a pedal crank rotatably connected to the frame, said multiple speed shaft drive comprising:

a drive assembly comprising:
a rear wheel hub rotatably connected with the frame of the bicycle;
a forward disk having a plurality of forward ring gears formed thereon, said forward disk being connected to the pedal crank of the bicycle so as to rotate therewith about a forward disk axis, said plurality of forward ring gears being concentrically disposed with respect to said forward axis;
a rearward disk having a plurality of rearward ring gears formed thereon, said rearward disk being connected to said rear wheel hub so as to rotate therewith about a rearward disk axis, said plurality of rearward ring gears being concentrically disposed with respect to said rearward axis;

a forward drive shaft having splines;

a rearward drive shaft having splines;

a free wheel mechanism connecting said forward drive shaft to said rearward drive shaft;

a forward pinion gear slidably mounted in gearingly meshed relationship with respect to said splines of said forward drive shaft; and a rearward pinion gear slidably mounted in gearingly meshed relationship with respect to said splines of said rearward drive shaft; and a clutch assembly comprising:

forward pinion gear reciprocation mechanism means for moving said forward pinion gear into gearingly meshed engagement with a selected forward ring gear of said plurality of forward ring gears of said forward disk;

rearward pinion gear reciprocation mechanism means for moving said rearward pinion gear into gearingly meshed engagement with a selected rearward ring gear of said plurality of rearward ring gears of said rearward disk;

clutch mechanism means located at said rear wheel hub for disengaging said selected rearward ring gear of said rearward disk from gearingly meshed engagement with said rearward pinion gear; and shift controller means for selectively actuating each of said forward pinion gear reciprocation means, said rearward pinion gear reciprocation means and said clutch mechanism means.

2. The multiple speed shaft drive of claim 1, wherein said shift controller means further comprises shift lever means mounted to the frame of the bicycle for providing user selection of said actuation of each of said forward pinion gear reciprocation means, said rearward pinion gear reciprocation means and said clutch mechanism means.

3. The multiple speed shaft drive of claim 2, wherein said shift controller means comprises:

a housing;

forward shift lever movably mounted with respect to said housing;

a rearward shift lever movably mounted with respect to said housing;

forward shift cable means for providing connection between said forward shift lever and said forward pinion gear reciprocation mechanism means, wherein selective movement of said forward shift lever with respect to said housing actuates said forward pinion gear reciprocation mechanism means; and rearward shift cable means for providing connection between said rearward shift lever and said rearward pinion gear reciprocation mechanism means, wherein selective movement of said rearward shift lever with respect to said housing actuates said rearward pinion gear reciprocation mechanism means.

4. The multiple speed shaft drive of claim 3, further comprising:

forward drive shaft detent means for providing location of said forward pinion gear with respect to said forward drive shaft alignably at each gearingly meshed engagement with said forward pinion gear with respect to each said forward ring gear of said plurality of forward ring gears; and rearward drive shaft detent means for providing location of said rearward pinion gear with respect to said rearward drive shaft alignably at each gearingly meshed engagement with said rearward pinion gear with respect to each said rearward ring gear of said plurality of rearward ring gears.

5. The multiple speed shaft drive of claim 4, wherein said shift controller means further comprises:

forward shift lever slot means for providing location of said forward shift lever concomitant with each said location of said forward pinion gear; and rearward shift lever slot means for providing location of said rearward shift lever concomitant with each said location of said rearward pinion gear.

6. The multiple speed shaft drive of claim 5, wherein said shift controller means further comprises clutch control cable means for providing connection between said rearward shift lever and said clutch mechanism means, wherein said selective movement of said rearward shift lever with respect to said housing actuates said clutch mechanism means.

7. The multiple speed shaft drive of claim 6, wherein said clutch control cable means further provides connection between said forward shift lever and said clutch mechanism means, wherein said selective movement of said forward shift lever with respect to said housing actuates said clutch mechanism means.

8. The multiple speed shaft drive of claim 7, wherein:

said forward pinion gear reciprocation mechanism means comprises:

a forward pinion gear bracket connected with the frame of the bicycle;

a forward pinion gear sleeve rotatably connected with said forward pinion gear;

means for biasing said forward pinion gear away from said forward pinion gear bracket; and means for connecting said forward shift cable means between said forward pinion gear sleeve and said forward pinion gear bracket to thereby cause movement of said forward pinion gear responsive to movement of said forward shift lever; and said rearward pinion gear reciprocation mechanism means comprises:

a rearward pinion gear bracket connected with the frame of the bicycle;

a rearward pinion gear sleeve rotatably connected with said rearward pinion gear;

means for biasing said rearward pinion gear away from said rearward pinion gear bracket; and means for connecting said rearward shift cable means between said rearward pinion gear sleeve and said rearward pinion gear bracket to thereby cause movement of said rearward pinion gear responsive to movement of said rearward shift lever.

9. The multiple speed shaft drive of claim 8, wherein said clutch mechanism means comprises:

means for slidably mounting said rearward disk with respect to said rear wheel hub;

means for biasing said rearward disk toward said rearward pinion gear; and clutch regulator means connected with said clutch control cable and said rearward disk for sliding said rearward disk away from said rearward pinion gear so as to disengage said selected rearward ring gear from gearingly meshed engagement with respect to said rearward pinion gear responsive to said selective movement of said shift lever means.

10. The multiple speed shaft drive of claim 9, wherein said clutch regulator means comprises:

a control rod having a first end and a second end;

means for connecting said clutch control cable to said first end of said control rod for pulling said control rod away from said rearward pinion gear responsive to said selective movement of said shift lever means;

a plurality of control bolts threadingly engaged with respect to said rearward disk;

passageway means in said rear wheel hub for receiving therethrough said plurality of control bolts and for providing rotative interconnection between said rearward disk and said rear wheel hub;

clutch latch means for selectively switching between a first state wherein said rearward disk is prevented from sliding away from said rearward pinion gear and a second state wherein said rearward disk is slidable away from said rearward pinion gear, said clutch latch means being biased into said first state;

keeper means connected with said plurality of control bolts for abutting said second end of said control rod when said control rod is pulled by said clutch control cable; and release means for switching said clutch latch means to said second state before said second end of said control rod abuts said keeper means.

11. The multiple speed shaft drive of claim 1, wherein said clutch mechanism means comprises:

means for slidably mounting said rearward disk with respect to said rear wheel hub;

means for biasing said rearward disk toward said rearward pinion gear; and clutch regulator means connected with said shift controller means and said rearward disk for sliding said rearward disk away from said rearward pinion gear so as to disengage said selected rearward ring gear from gearingly meshed engagement with respect to said rearward pinion gear responsive to said shift controller means.

12. The multiple speed shaft drive of claim 9, wherein said clutch regulator means comprises:

a control rod having a first end and a second end;

means for connecting said shift controller means to said first end of said control rod for pulling said control rod away from said rearward pinion gear responsive to said shift controller means;

a plurality of control bolts threadingly engaged with respect to said rearward disk;

passageway means in said rear wheel hub for receiving therethrough said plurality of control bolts and for providing rotative interconnection between said rearward disk and said rear wheel hub;

clutch latch means for selectively switching between a first state wherein said rearward disk is prevented from sliding away from said rearward pinion gear and a second state wherein said rearward disk is slidable away from said rearward pinion gear, said clutch latch means being biased into said first state;

keeper means connected with said plurality of control bolts for abutting said second end of said control rod when said control rod is pulled responsive to said shift controller means; and release means for switching said clutch latch means to said second state before said second end of said control rod abuts said keeper means.

13. A bicycle comprising:

a frame;

a pedal crank rotatably connected to said frame; and a multiple speed shaft drive comprising:

a drive assembly comprising:

a rear wheel hub rotatably connected with the frame of the bicycle;

a forward disk having a plurality of forward ring gears formed thereon, said forward disk being connected to the pedal crank of the bicycle so as to rotate therewith about a forward disk axis, said plurality of forward ring gears being concentrically disposed with respect to said forward axis;

a rearward disk having a plurality of rearward ring gears formed thereon, said rearward disk being connected to said rear wheel hub so as to rotate therewith about a rearward disk axis, said plurality of rearward ring gears being concentrically disposed with respect to said rearward axis;

a forward drive shaft having splines;

a rearward drive shaft having splines;

a free wheel mechanism connecting said forward drive shaft to said rearward drive shaft;

a forward pinion gear slidably mounted in gearingly meshed relationship with respect to said splines of said forward drive shaft; and a rearward pinion gear slidably mounted in gearingly meshed relationship with respect to said splines of said rearward drive shaft; and a clutch assembly comprising:

forward pinion gear reciprocation mechanism means for moving said forward pinion gear into gearingly meshed engagement with a selected forward ring gear of said plurality of forward ring gears of said forward disk;

rearward pinion gear reciprocation mechanism means for moving said rearward pinion gear into gearingly meshed engagement with a selected rearward ring gear of said plurality of rearward ring gears of said rearward disk;

clutch mechanism means located at said rear wheel hub for disengaging said selected rearward ring gear of said rearward disk from gearingly meshed engagement with said rearward pinion gear; and shift controller means for selectively actuating each of said forward pinion gear reciprocation means, said rearward pinion gear reciprocation means and said clutch mechanism means.

14. The bicycle of claim 13, wherein:

said shift controller means comprises:

shift lever means mounted to said frame for providing user selection of said actuation of each of said forward pinion gear reciprocation means, said rearward pinion gear reciprocation means and said clutch mechanism means; and said clutch mechanism means comprises:

means for slidably mounting said rearward disk with respect to said rear wheel hub;

means for biasing said rearward disk toward said rearward pinion gear; and clutch regulator means connected with said shift controller means and said rearward disk for sliding said rearward disk away from said rearward pinion gear so as to disengage said selected rearward ring gear from gearingly meshed engagement with respect to said rearward pinion gear responsive to said shift lever means.

15. The bicycle of claim 14, wherein said clutch regulator means comprises:

a control rod having a first end and a second end, said second end;

means for connecting said shift controller means to said first end of said control rod for pulling said control rod away from said rearward pinion gear responsive to said shift controller means;

a plurality of control bolts threadingly engaged with respect to said rearward disk;

passageway means in said rear wheel hub for receiving therethrough said plurality of control bolts and for providing rotative interconnection between said rearward disk and said rear wheel hub;

clutch latch means for selectively switching between a first state wherein said rearward disk is prevented from sighing away from said rearward pinion gear and a second state wherein said rearward disk is slidable away from said rearward pinion gear, said clutch latch means being biased into said first state;

keeper means connected with said plurality of control bolts for abutting said second end of said control rod when said control rod is pulled responsive to said shift controller means; and release means for switching said clutch latch means to said second state before said second end of said control rod abuts said keeper means.

16. A multiple speed shaft drive for a bicycle, wherein the bicycle has a frame and a pedal crank rotatably connected to the frame, said multiple speed shaft drive comprising:

a drive assembly comprising:

a rear wheel hub rotatably connected with the frame of the bicycle;

a forward disk having at least one forward ring gear formed thereon, said forward disk being connected to the pedal crank of the bicycle so as to rotate therewith about a forward disk axis, said at least one forward ring gear being concentrically disposed with respect to said forward axis;

a rearward disk having a plurality of rearward ring gears formed thereon, said rearward disk being connected to said rear wheel hub so as to rotate therewith about a rearward disk axis, said plurality of rearward ring gears being concentrically disposed with respect to said rearward axis;

a forward drive shaft;

a rearward drive shaft having splines;

a free wheel mechanism connecting said forward drive shaft to said rearward drive shaft;

a forward pinion gear mounted to said forward drive shaft; and a rearward pinion gear slidably mounted in gearingly meshed relationship with respect to said splines of said rearward drive shaft; and a clutch assembly comprising:

rearward pinion gear reciprocation mechanism means for moving said rearward pinion gear into gearingly meshed engagement with a selected rearward ring gear of said plurality of rearward ring gears of said rearward disk;

clutch mechanism means located at said rear wheel hub for disengaging said selected rearward ring gear of said rearward disk from gearingly meshed engagement with said rearward pinion gear; and shift controller means for selectively actuating said rearward pinion gear reciprocation means and said clutch mechanism means.

17. The multiple speed shaft drive of claim 16, wherein:

said shift controller means comprises:

shift lever means for providing user selection of said actuation of said rearward pinion gear reciprocation means and said clutch mechanism means; and said clutch mechanism means comprises:

means for slidably mounting said rearward disk with respect to said rear wheel hub;

means for biasing said rearward disk toward said rearward pinion gear; and clutch regulator means connected with said shift controller means and said rearward disk for sliding said rearward disk away from said rearward pinion gear so as to disengage said selected rearward ring gear from gearingly meshed engagement with respect to said rearward pinion gear responsive to said shift lever means.

18. A multiple speed shaft drive for a bicycle, wherein the bicycle has a frame and a pedal crank rotatably connected to the frame, said multiple speed shaft drive comprising:

a drive assembly comprising:

a rear wheel hub rotatably connected with the frame of the bicycle;

a forward disk having a plurality of forward ring gears formed thereon, said forward disk being connected to the pedal crank of the bicycle so as to rotate therewith about a forward disk axis, said plurality of forward ring gears being concentrically disposed with respect to said forward axis;

a rearward disk having at least one rearward ring gear formed thereon, said rearward disk being connected to said rear wheel hub so as to rotate therewith about a rearward disk axis, said at least one rearward ring gear being concentrically disposed with respect to said rearward axis;

a forward drive shaft having splines;

a rearward drive shaft;

a free wheel mechanism connecting shaft forward drive shaft to said rearward drive shaft;

a forward pinion gear slidably mounted in gearingly meshed relationship with respect to said splines of said forward drive shaft; and a rearward pinion gear mounted to said rearward drive shaft; and a clutch assembly comprising:

forward pinion gear reciprocation mechanism means for moving said forward pinion gear into gearingly meshed engagement with a selected forward ring gear of said plurality of forward ring gears of said forward disk;

clutch mechanism means located at said rear wheel hub for disengaging said selected rearward ring gear of said rearward disk from gearingly meshed engagement with said rearward pinion gear; and shift controller means for selectively actuating said forward pinion gear reciprocation means and said clutch mechanism means.

19. The multiple speed shaft drive of claim 18, wherein:

said shift controller means comprises:

shift lever means for providing user selection of said actuation of said forward pinion gear reciprocation means and said clutch mechanism means; and said clutch mechanism means comprises:

means for slidably mounting said rearward disk with respect to said rear wheel hub;

means for biasing said rearward disk toward said rearward pinion gear; and clutch regulator means connected with said shift controller means and said rearward disk for sliding said rearward disk away from said rearward pinion gear so as to disengage said selected rearward ring gear from gearingly meshed engagement with respect to said rearward pinion gear responsive to said shift lever means.

20. A clutch mechanism for a bicycle having a frame, a pedal crank rotatably connected to the frame, a rearward disk, a shaft drive gearingly connecting the pedal crank with the rearward disk, a shift controller and a free wheel mechanism, said clutch mechanism comprising:

a rear wheel hub rotatably connected with the frame of the bicycle;

means for slidably mounting the rearward disk with respect to said rear wheel hub, wherein said rearward disk rotates with said rear wheel hub;

means for biasing the rearward disk slidably toward engagement with the shaft drive; and clutch regulator means connected with the shift controller and the rearward disk for sliding the rearward disk away from the shaft drive so as to disengage the rearward disk from the shaft drive responsive to the shift controller.

* * * * *